United States Patent
Tsuji et al.

(10) Patent No.: US 11,919,515 B2
(45) Date of Patent: Mar. 5, 2024

(54) VEHICLE CONTROL DEVICE AND VEHICLE CONTROL METHOD

(71) Applicant: HONDA MOTOR CO., LTD., Tokyo (JP)

(72) Inventors: Kanta Tsuji, Wako (JP); Takafumi Hirose, Wako (JP); Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/024,786

(22) PCT Filed: Dec. 28, 2020

(86) PCT No.: PCT/JP2020/049142
§ 371 (c)(1),
(2) Date: Mar. 6, 2023

(87) PCT Pub. No.: WO2022/144975
PCT Pub. Date: Jul. 7, 2022

(65) Prior Publication Data
US 2023/0391332 A1    Dec. 7, 2023

(51) Int. Cl.
*B60W 30/16* (2020.01)
*B60W 40/08* (2012.01)
*B60W 60/00* (2020.01)

(52) U.S. Cl.
CPC .......... *B60W 30/16* (2013.01); *B60W 40/08* (2013.01); *B60W 60/0053* (2020.02);
(Continued)

(58) Field of Classification Search
None
See application file for complete search history.

(56) References Cited

U.S. PATENT DOCUMENTS

| 9,581,460 B1* | 2/2017 | McNew | G01C 21/3605 |
| 11,027,650 B2* | 6/2021 | Peng | B60L 58/12 |

(Continued)

FOREIGN PATENT DOCUMENTS

| CN | 109476311 | 3/2019 |
| CN | 109760679 | 5/2019 |

(Continued)

OTHER PUBLICATIONS

International Search Report and Written Opinion for International Application No. PCT/JP2020/049142 dated Feb. 16, 2021, 9 pages.

(Continued)

*Primary Examiner* — Jonathan M Dager
(74) *Attorney, Agent, or Firm* — Amin, Turocy & Watson, LLP

(57) ABSTRACT

A vehicle control device includes a recognizer configured to recognize a surrounding situation of a host vehicle and a driving controller configured to control one or both of steering and a speed of the host vehicle. The driving controller designates an inter-vehicle distance from the preceding vehicle that travels in front of the host vehicle as a first inter-vehicle distance when the host vehicle is allowed to travel in a first driving mode, designates an inter-vehicle distance from the preceding vehicle as a second inter-vehicle distance when the host vehicle is allowed to travel in a second driving mode, and designates the target inter-vehicle distance from the preceding vehicle in the second driving mode as a longer distance between the first inter-vehicle distance and the second inter-vehicle distance when the driving mode is switched from the first driving mode to the second driving mode.

14 Claims, 6 Drawing Sheets

| | DRIVING MODE | CONTROL STATE | TASK | TARGET INTER-VEHICLE DISTANCE | |
|---|---|---|---|---|---|
| SECOND DRIVING MODE | MODE F | AUTOMATED DRIVING (EMERGENCY STOP) | FORWARD MONITORING:UNNECESSARY STEERING GRIP:UNNECESSARY | D2 | |
| FIRST DRIVING MODE | MODE A | AUTOMATED DRIVING | FORWARD MONITORING:UNNECESSARY STEERING GRIP:UNNECESSARY | D1 | TASK:MILD |
| | MODE B | DRIVING ASSISTANCE | FORWARD MONITORING:NECESSARY STEERING GRIP:UNNECESSARY | D3 | |
| | MODE C | DRIVING ASSISTANCE | FORWARD MONITORING:NECESSARY STEERING GRIP:NECESSARY | D3 | |
| | MODE D | DRIVING ASSISTANCE | FORWARD MONITORING:NECESSARY AT LEAST CERTAIN DEGREE OF DRIVING OPERATION IS NECESSARY | D3 | |
| | MODE E | MANUAL DRIVING | FORWARD MONITORING:NECESSARY DRIVING OPERATION IS NECESSARY TOGETHER WITH STEERING AND/OR ACCELERATION/DECELERATION | MANUAL | TASK:SEVERE |

(52) U.S. Cl.
CPC . *B60W 2040/0818* (2013.01); *B60W 2420/52* (2013.01); *B60W 2554/802* (2020.02)

(56) References Cited

U.S. PATENT DOCUMENTS

| | | | | |
|---|---|---|---|---|
| 11,353,866 | B2* | 6/2022 | Obata | B60W 60/0059 |
| 11,390,279 | B2* | 7/2022 | Arai | B60W 10/06 |
| 2017/0334454 | A1* | 11/2017 | Abe | B60W 50/082 |
| 2017/0355377 | A1* | 12/2017 | Vijaya Kumar | B60W 50/0098 |
| 2017/0365165 | A1* | 12/2017 | Landfors | G06F 16/182 |
| 2018/0113450 | A1* | 4/2018 | Sherony | B60W 10/04 |
| 2018/0118219 | A1* | 5/2018 | Hiei | B60W 50/14 |
| 2018/0141568 | A1* | 5/2018 | Singhal | G08G 1/161 |
| 2019/0135302 | A1* | 5/2019 | Kishi | B60W 10/184 |
| 2019/0171211 | A1* | 6/2019 | Jang | B60W 60/00 |
| 2019/0283757 | A1* | 9/2019 | Honda | B60W 30/165 |
| 2019/0286130 | A1* | 9/2019 | Tsuchiya | G06V 20/588 |
| 2019/0295417 | A1* | 9/2019 | Hiramatsu | B60W 50/10 |
| 2019/0370579 | A1* | 12/2019 | Sugawara | B60W 30/18145 |
| 2019/0384292 | A1* | 12/2019 | Aragon | B60W 40/09 |
| 2020/0062272 | A1* | 2/2020 | Sugiura | B60W 30/0956 |
| 2020/0130710 | A1* | 4/2020 | Hase | B60W 30/182 |
| 2020/0189589 | A1* | 6/2020 | Ishioka | B60W 30/17 |
| 2020/0307573 | A1 | 10/2020 | Kato et al. | |
| 2020/0307583 | A1* | 10/2020 | Yashiro | G05D 1/0088 |
| 2020/0307631 | A1* | 10/2020 | Tsuji | B60T 17/22 |
| 2020/0307632 | A1* | 10/2020 | Tsuji | B60W 60/0059 |
| 2020/0307634 | A1* | 10/2020 | Yashiro | B60W 60/0018 |
| 2020/0307640 | A1* | 10/2020 | Tsuji | B60W 10/20 |
| 2020/0307642 | A1* | 10/2020 | Tsuji | B60W 10/04 |
| 2020/0307646 | A1* | 10/2020 | Kato | B60W 50/00 |
| 2020/0398868 | A1* | 12/2020 | Horii | B60W 50/14 |
| 2021/0001849 | A1* | 1/2021 | Miura | B60W 60/0023 |
| 2021/0031768 | A1* | 2/2021 | Yano | B60W 60/0023 |
| 2021/0122398 | A1* | 4/2021 | Kim | G05D 1/0038 |
| 2021/0146943 | A1* | 5/2021 | Oniwa | B60R 21/00 |
| 2021/0253133 | A1* | 8/2021 | Miyamoto | B60W 50/029 |
| 2021/0278840 | A1* | 9/2021 | Jaegal | G05D 1/0088 |
| 2021/0309262 | A1* | 10/2021 | Sugano | B60W 60/0051 |
| 2022/0144083 | A1* | 5/2022 | Seitz | B60K 35/00 |
| 2022/0219689 | A1* | 7/2022 | Chang | B60W 30/08 |
| 2022/0274621 | A1* | 9/2022 | Ota | B60W 60/0016 |
| 2022/0340156 | A1* | 10/2022 | Yamamoto | G08G 1/16 |
| 2023/0037467 | A1* | 2/2023 | Yamamoto | B60W 60/0053 |
| 2023/0063930 | A1* | 3/2023 | Ichida | G06V 40/166 |
| 2023/0103715 | A1* | 4/2023 | Miyake | B60W 50/14 701/36 |
| 2023/0182722 | A1* | 6/2023 | Park | B60W 60/0015 701/301 |
| 2023/0234618 | A1* | 7/2023 | Ji | B60W 30/095 701/23 |
| 2023/0286509 | A1* | 9/2023 | Kume | B60W 50/14 |

FOREIGN PATENT DOCUMENTS

| | | |
|---|---|---|
| CN | 110281941 | 9/2019 |
| CN | 111332291 | 6/2020 |
| CN | 111727145 | 9/2020 |
| CN | 111746516 | 10/2020 |
| CN | 111762169 | 10/2020 |
| JP | 2011-240816 | 12/2011 |
| JP | 2017-149208 | 8/2017 |
| JP | 2018-075987 | 5/2018 |
| JP | 2020-097310 | 6/2020 |
| JP | 2020-158021 | 10/2020 |
| JP | 2020-158047 | 10/2020 |
| WO | 2019/088893 | 5/2019 |

OTHER PUBLICATIONS

Japanese Office Action for Japanese Patent Application No. 2021-576843 dated Mar. 8, 2022.
Chinese Office Action for Chinese Patent Application No. 202080105167.8 dated Jun. 16, 2023.

* cited by examiner

FIG. 3

| DRIVING MODE | CONTROL STATE | TASK | TARGET INTER-VEHICLE DISTANCE |
|---|---|---|---|
| MODE F | AUTOMATED DRIVING (EMERGENCY STOP) | FORWARD MONITORING:UNNECESSARY STEERING GRIP:UNNECESSARY | D2 |
| MODE A | AUTOMATED DRIVING | FORWARD MONITORING:UNNECESSARY STEERING GRIP:UNNECESSARY | D1 |
| MODE B | DRIVING ASSISTANCE | FORWARD MONITORING:NECESSARY STEERING GRIP:UNNECESSARY | D3 |
| MODE C | DRIVING ASSISTANCE | FORWARD MONITORING:NECESSARY STEERING GRIP:NECESSARY | D3 |
| MODE D | DRIVING ASSISTANCE | FORWARD MONITORING:NECESSARY AT LEAST CERTAIN DEGREE OF DRIVING OPERATION IS NECESSARY | D3 |
| MODE E | MANUAL DRIVING | FORWARD MONITORING:NECESSARY DRIVING OPERATION IS NECESSARY TOGETHER WITH STEERING AND/OR ACCELERATION/DECELERATION | MANUAL |

SECOND DRIVING MODE: MODE F

FIRST DRIVING MODE: MODE A, MODE B, MODE C, MODE D

TASK:MILD ←——→ TASK:SEVERE

FIG. 4
192

| INTER-VEHICLE DISTANCE SETTING PATTERN | FIRST DRIVING MODE | SECOND DRIVING MODE | TARGET INTER-VEHICLE DISTANCE IN SWITCHING PERIOD | TARGET INTER-VEHICLE DISTANCE IN SECOND DRIVING MODE |
|---|---|---|---|---|
| PATTERN 1 | MODE C, MODE D | MODE F | D2 | D2 |
| PATTERN 2 | MODE B | | D2 | D2 |
| PATTERN 3 | MODE A | | D1 | D1 |

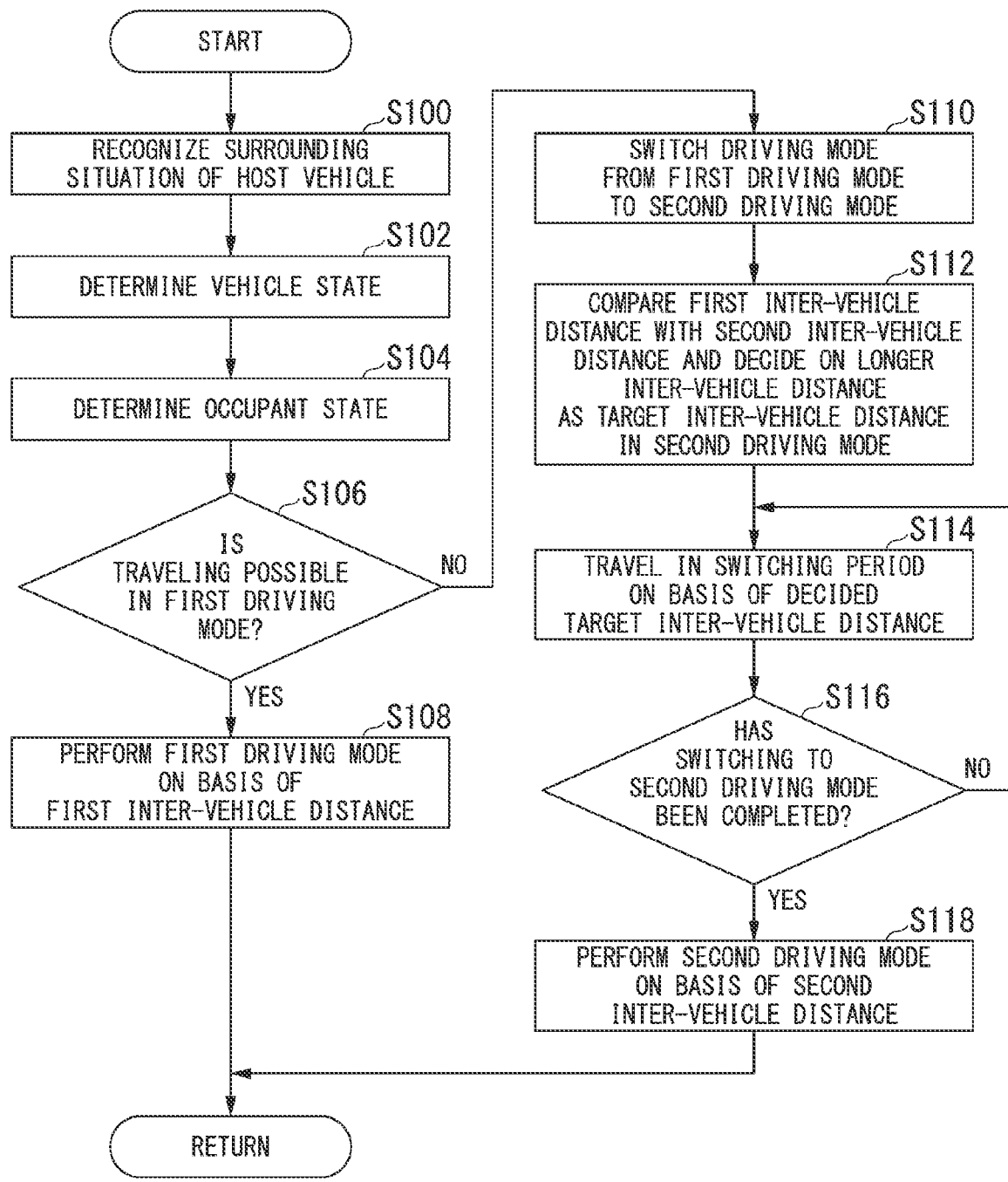

VEHICLE CONTROL DEVICE AND VEHICLE CONTROL METHOD

TECHNICAL FIELD

The present invention relates to a vehicle control device, a vehicle control method, and a program.

BACKGROUND ART

Research is underway on technology for automatically controlling one or both of acceleration/deceleration and steering of a vehicle to allow the vehicle to travel (hereinafter referred to as "automated driving"). In this regard, technology for adjusting a magnitude of an inter-vehicle distance during a tracking traveling mode and increasing a safety margin in an emergency stop mode as compared with a non-execution mode has been disclosed (see, for example, Patent Literature 1 and 2).

CITATION LIST

Patent Literature

[Patent Literature 1]
  Japanese Unexamined Patent Application, First Publication No. 2020-97310
[Patent Literature 2]
  Japanese Unexamined Patent Application, First Publication No. 2020-158047

SUMMARY OF INVENTION

Technical Problem

However, control of an inter-vehicle distance in a period in which a driving mode of a vehicle is switched is not taken into account in the conventional technology.

An aspect of the present invention has been made in consideration of such circumstances and an objective of the present invention is to provide a vehicle control device, a vehicle control method, and a program capable of allowing a host vehicle to travel in a more appropriate state even in a period in which a driving mode is switched.

Solution to Problem

A vehicle control device, a vehicle control method, and a program according to the present invention adopt the following configurations.

(1): According to an aspect of the present invention, there is provided a vehicle control device including: a recognizer configured to recognize a surrounding situation of a host vehicle; and a driving controller configured to control one or both of steering and a speed of the host vehicle, wherein the driving controller allows the host vehicle to travel in any one of a plurality of driving modes including a first driving mode in which the host vehicle is allowed to travel such that an inter-vehicle distance between a preceding vehicle recognized by the recognizer and the host vehicle becomes a target inter-vehicle distance and a second driving mode in which the host vehicle is decelerated and moved to a target position, wherein the driving controller designates an inter-vehicle distance from the preceding vehicle that travels in front of the host vehicle as a first inter-vehicle distance when the host vehicle is allowed to travel in the first driving mode, wherein the driving controller designates an inter-vehicle distance from the preceding vehicle as a second inter-vehicle distance when the host vehicle is allowed to travel in the second driving mode, and wherein the driving controller designates the target inter-vehicle distance from the preceding vehicle in the second driving mode as a longer distance between the first inter-vehicle distance and the second inter-vehicle distance when the driving mode is switched from the first driving mode to the second driving mode in a prescribed state.

(2): In the above-described aspect (1), the driving controller decides on the inter-vehicle distance from the preceding vehicle in a switching period between the first driving mode and the second driving mode as the first inter-vehicle distance when an automation degree in the first driving mode is a prescribed degree.

(3): In the above-described aspect (1) or (2), the driving controller designates the target inter-vehicle distance in a switching period between the first driving mode and the second driving mode as an inter-vehicle distance in the second driving mode.

(4): In any one of the above-described aspects (1) to (3), the vehicle control device further includes an external detector configured to detect a surrounding situation of the host vehicle, wherein the recognizer recognizes the surrounding situation of the host vehicle on the basis of a detection result of the external detector, and wherein the prescribed state is a state in which an abnormality has occurred in at least a part of the external detector.

(5): In the above-described aspect (4), the external detector includes at least one of a camera, a radar device, a light detection and ranging (LIDAR) sensor, and a sonar mounted in the host vehicle.

(6): In any one of the above-described aspects (1) to (5), the vehicle control device further includes an in-vehicle monitor configured to monitor a state of an occupant inside of the host vehicle, wherein the prescribed state is a state in which it is determined that the occupant is not suitable for driving on the basis of a monitoring result of the in-vehicle monitor.

(7): In any one of the above-described aspects (1) to (6), a switching period between the first driving mode and the second driving mode is greater than or equal to a prescribed period of time.

(8): In any one of the above-described aspects (1) to (7), the driving controller allows the host vehicle to travel in the first driving mode or a driving mode having a lower automation degree than the first driving mode when the prescribed state has been eliminated and an occupant of the host vehicle has performed a prescribed operation within a period in which the driving mode is switched.

(9): In any one of the above-described aspects (1) to (8), the driving controller switches the driving mode of the host vehicle to a manual driving mode when an occupant of the host vehicle has been allowed to drive the host vehicle according to a driving change after the host vehicle was allowed to travel according to the second driving mode.

(10): In any one of the above-described aspects (1) to (9), the driving controller designates a longest inter-vehicle distance among a plurality of first inter-vehicle distances as the target inter-vehicle distance in the switching period when the first inter-vehicle distance in the first driving mode has been set for each of a plurality of different automation degrees included in the first driving mode.

(11): In any one of the above-described aspects (1) to (9), the driving controller designates a first inter-vehicle distance associated with a congestion time-specific tracking mode included in the first driving mode among the plurality of first inter-vehicle distances as the target inter-vehicle distance in the switching period when the first inter-vehicle distance has been set for each of a plurality of automation degrees included in the first driving mode.

(12): According to an aspect of the present invention, there is provided a vehicle control method including: recognizing, by a computer, a surrounding situation of a host vehicle; controlling, by the computer, one or both of steering and a speed of the host vehicle; allowing, by the computer, the host vehicle to travel in any one of a plurality of driving modes including a first driving mode in which the host vehicle is allowed to travel such that an inter-vehicle distance between a recognized preceding vehicle and the host vehicle becomes a target inter-vehicle distance and a second driving mode in which the host vehicle is decelerated and moved to a target position; designating, by the computer, an inter-vehicle distance from the preceding vehicle that travels in front of the host vehicle as a first inter-vehicle distance when the host vehicle is allowed to travel in the first driving mode; designating, by the computer, an inter-vehicle distance from the preceding vehicle as a second inter-vehicle distance when the host vehicle is allowed to travel in the second driving mode, and designating, by the computer, the target inter-vehicle distance from the preceding vehicle in the second driving mode as a longer distance between the first inter-vehicle distance and the second inter-vehicle distance when the driving mode is switched from the first driving mode to the second driving mode in a prescribed state.

(13): According to an aspect of the present invention, there is provided a program for causing a computer to: recognize a surrounding situation of a host vehicle; control one or both of steering and a speed of the host vehicle; allow the host vehicle to travel in any one of a plurality of driving modes including a first driving mode in which the host vehicle is allowed to travel such that an inter-vehicle distance between a recognized preceding vehicle and the host vehicle becomes a target inter-vehicle distance and a second driving mode in which the host vehicle is decelerated and moved to a target position; designate an inter-vehicle distance from the preceding vehicle that travels in front of the host vehicle as a first inter-vehicle distance when the host vehicle is allowed to travel in the first driving mode; designate an inter-vehicle distance from the preceding vehicle as a second inter-vehicle distance when the host vehicle is allowed to travel in the second driving mode, and designate the target inter-vehicle distance from the preceding vehicle in the second driving mode as a longer distance between the first inter-vehicle distance and the second inter-vehicle distance when the driving mode is switched from the first driving mode to the second driving mode in a prescribed state.

Advantageous Effects of Invention

According to the above-described aspects (1) to (13), it is possible to allow a host vehicle to travel in a more appropriate state even in a period in which a driving mode is switched.

BRIEF DESCRIPTION OF DRAWINGS

FIG. 3 is a diagram showing an example of relationships between a driving mode, a control state of a host vehicle M, a task, and a target inter-vehicle distance from a preceding vehicle.
FIG. 4 is a diagram for describing content of inter-vehicle setting information 192.
FIG. 6 is a flowchart showing an example of a flow of a process executed by an automated driving control device 100.

DESCRIPTION OF EMBODIMENTS

Figure 1:
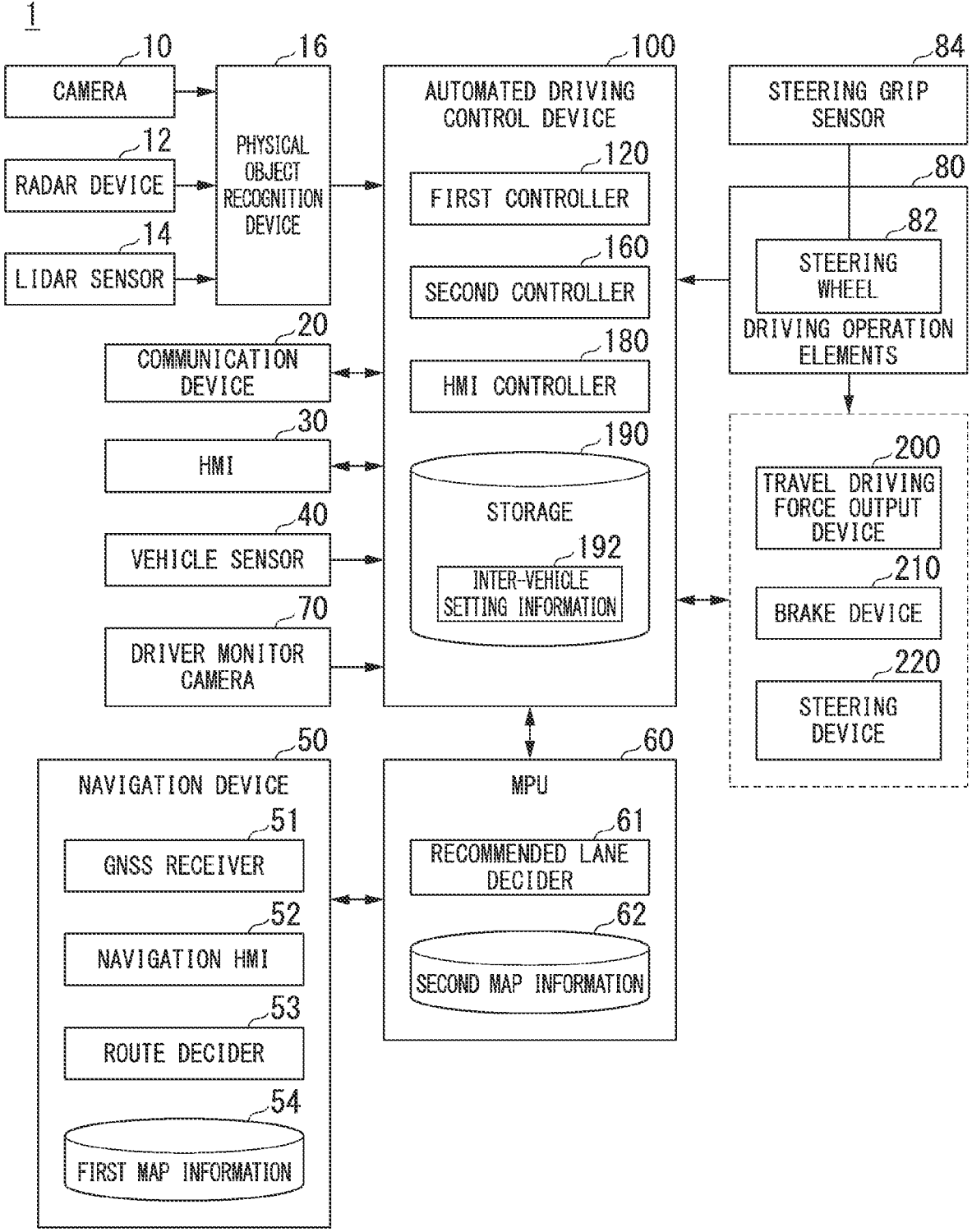
FIG. 1 is a configuration diagram of a vehicle system 1 using a vehicle control device according to an embodiment.

Embodiments of a vehicle control device, a vehicle control method, and a program of the present invention will be described below with reference to the drawings.
[Overall Configuration]
FIG. 1 is a configuration diagram of a vehicle system 1 using the vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. Also, a combination of the camera 10, the radar device 12, and the LIDAR sensor 14 is an example of an "external detector." The external detector may include another detector (for example, sonar) that recognizes a surrounding situation of the vehicle (for example, an obstacle near the vehicle and the like). Also, the external detector may include at least one of the camera 10, the radar device 12, the LIDAR sensor 14, or a sonar. A combination of the driver monitor camera 70 and a driver state determiner to be described below is an example of an "in-vehicle monitor."

For example, the camera 10 is a digital camera using a solid-state imaging element such as a charge-coupled device (CCD) or a complementary metal-oxide semiconductor (CMOS). The camera 10 is attached to any location on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and a speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object on the basis of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 included in the external detector to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle present in the vicinity of the host vehicle M, or communicates with various types of server devices via a radio base station, using, for example, a cellular network or a Wi-Fi network, Bluetooth (registered trademark), dedicated short range communication (DSRC), or the like.

The HMI 30 presents various types of information to an occupant of the host vehicle M and receives an input operation by the occupant according to control of the HMI controller 180. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect angular velocity around a vertical axis, a direction sensor configured to detect a direction of the host vehicle M, and the like.

For example, the navigation device 50 includes a global navigation satellite system (GNSS) receiver 51, a navigation HMI 52, and a route decider 53. The navigation device 50 stores first map information 54 in a storage device such as a hard disk drive (HDD) or a flash memory. The GNSS receiver 51 identifies a position of the host vehicle M based on a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 divides the route on the map provided from the navigation device 50 into a plurality of blocks (for example, divides the route every 100 [m] in a traveling direction of the vehicle), and decides on a recommended lane for each block with reference to the second map information 62. The recommended lane decider 61 determines in what lane numbered from the left the vehicle will travel. The recommended lane decider 61 decides on the recommended lane such that the host vehicle M can travel along a reasonable route for traveling to a branching destination when there is a branch point in the route on the map.

The second map information 62 is map information having higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

The driver monitor camera 70 is, for example, a digital camera that uses a solid-state image sensor such as a CCD or a CMOS. The driver monitor camera 70 is attached to any location on the host vehicle M with respect to a position and a direction where the head of the occupant (the driver) sitting in the driver's seat of the host vehicle M can be imaged from the front (in a direction in which his/her face is imaged). For example, the driver monitor camera 70 is attached to an upper part of a display device provided on the central portion of the instrument panel of the host vehicle M.

For example, the driving operation elements 80 include an accelerator pedal, a brake pedal, a shift lever, and other operation elements in addition to a steering wheel 82. A sensor configured to detect an amount of operation or the presence or absence of an operation is attached to the driving operation element 80 and a detection result thereof is output to the automated driving control device 100 or some or all of the travel driving force output device 200, the brake device 210, and the steering device 220. The steering wheel 82 is an example of an "operation element for receiving a steering operation of the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force is applied) to the automated driving control device 100.

The automated driving control device 100 includes, for example, the first controller 120, the second controller 160, the HMI controller 180, and the storage 190. Each of the first controller 120, the second controller 160, and the HMI controller 180 is implemented, for example, by a hardware processor such as a central processing unit (CPU) executing a program (software). Some or all of these components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The automated driving control device 100 is an example of a "vehicle control device." A combination of the action plan generator 140 and the second controller 160 is an example of a "driving controller."

The storage 190 may be implemented by the various types of storage devices described above, an electrically erasable programmable read-only memory (EEPROM), a read-only memory (ROM), a random-access memory (RAM), or the like. The storage 190 stores, for example, inter-vehicle setting information 192, information necessary for executing driving control according to the present embodiment, various types of other information, programs, and the like. The inter-vehicle setting information 192 includes, for example, information about a target inter-vehicle distance between the preceding vehicle and the host vehicle M, which is set in accordance with the driving mode executed by the automated driving control device 100. Content of the inter-vehicle setting information 192 will be described below.

Figure 2:
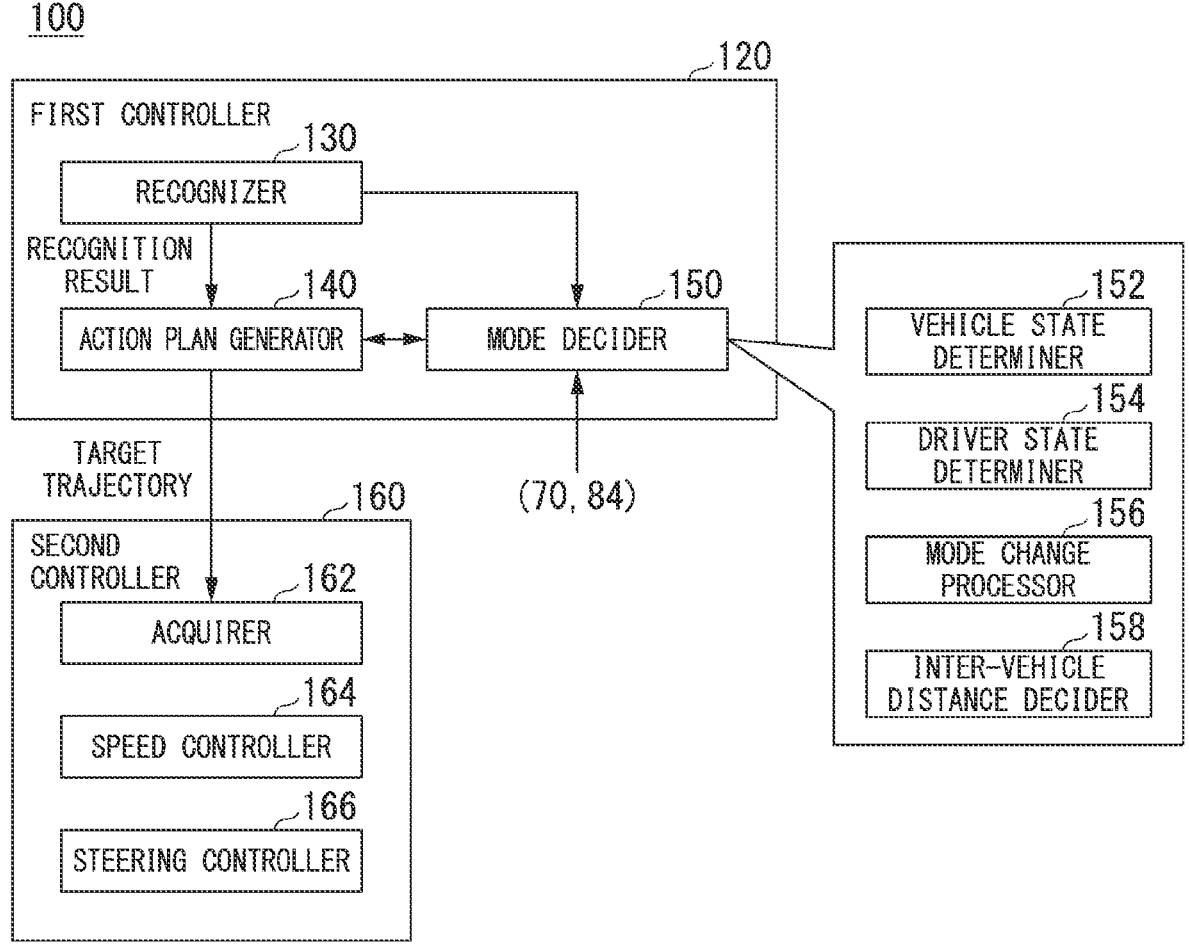
FIG. 2 is a functional configuration diagram of a first controller 120 and a second controller 160.

FIG. 2 is a functional configuration diagram of the first controller 120 and the second controller 160. The first controller 120 includes, for example, a recognizer 130, an action plan generator 140, and a mode decider 150. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like with which pattern matching is possible) in parallel and performing integrated evaluation by assigning scores to both recognitions. Thereby, the reliability of automated driving is ensured.

The recognizer 130 recognizes a surrounding situation of the host vehicle M. For example, the recognizer 130 recognizes states of a position, a speed, acceleration, and the like of a physical object near the host vehicle M on the basis of information input from the camera 10, the radar device 12, the LIDAR sensor 14, and the like via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a region. The "state" of a physical object may include acceleration or jerk of the physical object or an "action state" (for example, whether or not a lane change is being made or intended).

For example, the recognizer 130 recognizes a lane in which the host vehicle M is traveling (a traveling lane). For example, the recognizer 130 recognizes the traveling lane by comparing a pattern of a road marking (for example, an arrangement of solid lines and broken lines) obtained from the second map information 62 with a pattern of road markings in the vicinity of the host vehicle M recognized from an image captured by the camera 10. The recognizer 130 may recognize a traveling lane by recognizing a traveling path boundary (a road boundary) including a road marking, a road shoulder, a curb, a median strip, a guardrail, or the like as well as a road marking. In this recognition, a position of the host vehicle M acquired from the navigation device 50 or a processing result of the INS may be added. Also, the recognizer 130 recognizes a temporary stop line, an obstacle, red traffic light, a toll gate, and other road events.

When the traveling lane is recognized, the recognizer 130 recognizes a position or orientation of the host vehicle M with respect to the traveling lane. For example, the recognizer 130 may recognize a gap of a reference point of the host vehicle M from the center of the lane and an angle formed with respect to a line connected to the center of the lane in the traveling direction of the host vehicle M as a relative position and orientation of the host vehicle M related to the traveling lane. Alternatively, the recognizer 130 may recognize a position of the reference point of the host vehicle M related to one side end portion (a road marking or a road boundary) of the traveling lane or the like as a relative position of the host vehicle M related to the traveling lane.

The action plan generator 140 generates a future target trajectory along which the host vehicle M automatically travels (independently of the driver's operation) such that the host vehicle M can generally travel in the recommended lane decided on by the recommended lane decider 61 and further cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information about the target speed or the target acceleration is represented by an interval between the trajectory points.

The action plan generator 140 may set an automated driving event when a target trajectory is generated. Automated driving events include a constant-speed traveling event, a low-speed tracking traveling event, a lane change event, a branch point-related movement event, a merging point-related movement event, a takeover event, and the like. The action plan generator 140 generates a target trajectory according to an activated event.

The mode decider 150 decides on the driving mode of the host vehicle M as any one of a plurality of driving modes in which tasks imposed on the driver are different. The driving controller allows the host vehicle M to travel in the mode decided on by the mode decider 150. The mode decider 150 includes, for example, a vehicle state determiner 152, a driver state determiner 154, a mode change processor 156, and an inter-vehicle distance decider 158. Individual functions of the above components will be described below.

FIG. 3 is a diagram showing an example of relationships between a driving mode, a control state of a host vehicle M, a task, and a target inter-vehicle distance from a preceding vehicle. The driving modes of the host vehicle M include, for example, six modes from mode A to mode F. Modes A, B, C, and D are examples of a "first driving mode." Mode F is an example of a "second driving mode." In modes A to E, an automation degree of a control state, i.e., driving control of the host vehicle M, is highest in mode A, decreases in the order of mode B, mode C, and mode D, and is lowest in mode E. In contrast, a task imposed on the driver is mildest in mode A, becomes severer in the order of mode B, mode C, and mode D, and is severest in mode E in which manual driving is performed. Also, because the control state is not automated driving in modes B to E, the automated driving control device 100 is responsible for ending the control related to automated driving and shifting the driving mode to driving assistance or manual driving.

Mode F is, for example, a driving mode for the purpose of minimizing the risk associated with the traveling of the host vehicle M and may be referred to as a minimum risk maneuver (MRM) mode. Hereinafter, the content of each mode will be exemplified.

In mode A, the state is an automated driving state and neither monitoring of surroundings of the host vehicle M nor gripping of the steering wheel 82 (steering grip in FIG. 3) is imposed on the driver. Surroundings monitoring includes at least monitoring a forward direction of the host vehicle M (forward monitoring in FIG. 3). However, even in mode A, the driver is required to be in a posture where the fast shift to manual driving is enabled in response to a request from the system centered on the automated driving control device 100. Also, the term "automated driving" as used herein indicates that both steering and acceleration/deceleration of the host vehicle M are controlled independently of the operation of the driver. The term "forward or front" indicates a space in a traveling direction of the host vehicle M that is visually recognized through the front windshield. Mode A is a driving mode in which the host vehicle M travels at a prescribed speed (for example, about 50 [km/h]) or less on a motorway such as an expressway and which can be executed when a condition in which there is a tracking target preceding vehicle or the like is satisfied. Mode A may be referred to as a congestion time-specific tracking mode (or a traffic jam pilot (TJP) mode). When the driving mode of mode A is executed, the automated driving control device 100 allows the host vehicle M to travel by tracking the preceding vehicle such that an inter-vehicle distance between the host vehicle M and the preceding vehicle that travels in front of the host vehicle M in a lane that is the same as that of the host vehicle M becomes a target inter-vehicle distance D1. When this condition is no longer satisfied, the mode decider 150 changes the driving mode of the host vehicle M to mode B.

In mode B, the state is a driving assistance state and a task of monitoring surroundings including a forward direction of the host vehicle M (hereinafter simply referred to as forward monitoring) is imposed on the driver, but a task of gripping the steering wheel 82 is not imposed on the driver. In mode C, the state is a driving assistance state and a forward monitoring task and a task of gripping the steering wheel 82 are imposed on the driver. Mode D is a driving mode in which a certain degree of driving operation by the driver is required for at least one of steering and acceleration/deceleration of the host vehicle M. For example, in mode D, driving assistance such as adaptive cruise control (ACC) or lane keeping assist system (LKAS) is provided. When the driving modes of modes B to D are executed, the automated driving control device 100 allows the host vehicle M to travel such that an inter-vehicle distance between the preceding vehicle and the host vehicle M becomes a target inter-vehicle distance D3. The target inter-vehicle distances D1 and D3 in the first driving mode are examples of a "first inter-vehicle distance." The first inter-vehicle distance may be set differently depending on the mode. For example, the target inter-vehicle distance D3 is shorter than the target inter-vehicle distance D1. In the case of modes B to D, because the driver needs to perform forward monitoring, the driver immediately easily ascertains that the host vehicle M is approaching the preceding vehicle or that there is a possibility that the host vehicle M will come into contact with the preceding vehicle. Thus, even if the target inter-vehicle distance D3 is shorter than the target inter-vehicle distance D1 in mode A that does not require forward monitoring, contact with the preceding vehicle can be avoided.

In mode E, both steering and acceleration/deceleration are in a state of manual driving that requires a driving operation of the driver. In both modes D and E, a task of monitoring a forward direction of the host vehicle M is naturally imposed on the driver. In the case of mode E, because the driving is manual driving, the driver can arbitrarily adjust the target inter-vehicle distance from the preceding vehicle.

For example, mode F is executed when it is determined that the driver is not suitable for driving on the basis of a state in which an abnormality occurs in at least a part of the external detector of the host vehicle M or a result of analyzing a captured image of the driver monitor camera 70. In mode F, the host vehicle M is allowed to be basically decelerated independently of an operation of the driver and to be moved to a target position (together with an emergency stop operation). In mode F, the steering control of the host vehicle M may be executed as needed. The target position is, for example, a position where the host vehicle M is estimated to be safe. The target position may be, for example, a shoulder of a traveling road, an empty space or a parking lot near the road, or the like. For example, the target position may be acquired by analyzing the captured image of the camera 10. The target position within a prescribed distance from the host vehicle M in the traveling direction of the host vehicle M may be acquired with reference to map information (the first map information 54 and the second map information 62) on the basis of the position information of the host vehicle M. Also, when there is no appropriate target position outside of the host vehicle traveling lane, the target position may be defined within the host vehicle traveling lane. In the case of mode F, an inter-vehicle distance between the host vehicle M and the preceding vehicle is set to a target inter-vehicle distance D2. For example, the target inter-vehicle distance D2 is shorter than the target inter-vehicle distance D1 and longer than the target inter-vehicle distance D3. The target inter-vehicle distance D2 in the second driving mode is an example of a "second inter-vehicle distance."

The mode decider 150 changes the driving mode of the host vehicle M to a driving mode in which the task is severer when the task related to the decided driving mode is not executed by the driver.

For example, while mode A is being executed, when the driver is in a posture where he/she cannot shift the driving to manual driving in response to a request from the system (for example, when he/she continues to look outside an allowable area or when a sign that driving becomes difficult is detected), the mode decider 150 allows the HMI controller 180 to perform control for prompting the driver to shift the driving to manual driving of mode E using the HMI 30. Also, when the driver does not respond even though a prescribed period of time elapses after the HMI controller 180 is allowed to perform control for prompting the driver to perform manual driving or when it is estimated that the driver does not perform manual driving, the mode decider 150 performs control for switching the mode from mode A to mode F, allowing the host vehicle M to gradually decelerate such that the host vehicle M is close to a target position (for example, a road shoulder), and stopping automated driving. Also, after the automated driving is stopped, the host vehicle M is in the state of mode D or E and the host vehicle M can be started by the manual driving of the driver. Hereinafter, the same is true for "stopping automated driving."

When the driver is not performing forward monitoring in mode B, the mode decider 150 performs control for prompting the driver to perform forward monitoring using the HMI 30, allowing the host vehicle M to be gradually stopped close to the target position by switching the mode from mode B to mode F when the driver does not respond, and stopping the automated driving. When the driver is not performing forward monitoring in mode C or is not gripping the steering wheel 82, the mode decider 150 performs control for prompting the driver to perform the forward monitoring and/or grip the steering wheel 82 using the HMI 30, allowing the host vehicle M to be gradually stopped close to the target position by switching the mode from mode C to mode F when the driver does not respond, and stopping the automated driving.

The vehicle state determiner 152 monitors the state of the host vehicle M for the above-described mode change and determines whether or not the state of the host vehicle M is a state in which the driving mode in operation can continue. For example, the vehicle state determiner 152 determines that the state is not a state in which mode A can continue when an abnormality has occurred in at least a part of the external detector (for example, the camera 10, the radar device 12, the LIDAR sensor 14, or the sonar) of the host vehicle M. The case where an abnormality has occurred is, for example, a case where a detection result from a target device cannot be acquired for a prescribed period of time or longer, a case where the detection result is an abnormal value, a case where error information is output from the target device, or the like.

The driver state determiner 154 determines whether or not the occupant (the driver) is in a state suitable for driving. For example, the driver state determiner 154 monitors the driver's state for the above-described mode change and determines whether or not the driver's state is a state corresponding to the task on the basis of a monitoring result. For example, the driver state determiner 154 performs a posture estimation process by analyzing an image captured by the driver monitor camera 70 and determines whether or not the driver is in a posture where he/she cannot shift driving to manual driving in response to a request from the system. Also, the driver state determiner 154 analyzes the image captured by the driver monitor camera 70 to perform a line-of-sight estimation process and determines whether or not the driver is monitoring the traveling direction (the forward direction) of the host vehicle M. When it is determined that the state does not correspond to the task for a prescribed period of time or longer, the driver state determiner 154 determines that the driver is not suitable for driving associated with the task. Also, when it is determined that the state corresponds to the task, the driver state determiner 154 determines that the driver is in a state suitable for driving associated with the task. Also, the driver state determiner 154 may determine whether or not the occupant is in a state in which he/she does not change driving.

The mode change processor 156 performs various types of processes for changing the mode. For example, the mode change processor 156 gives an operation instruction to the driving assistance device (not shown), controls the HMI 30 such that the driver is prompted to take action, and instructs the action plan generator 140 to generate a target trajectory for making an emergency stop based on mode F.

When the driving mode of the host vehicle M is switched from the first driving mode to the second driving mode, the inter-vehicle distance decider 158 decides on a target inter-vehicle distance between the host vehicle M and the preceding vehicle while the second driving mode is in operation or in a period in which the mode is switched to the second driving mode. Details of the function of the inter-vehicle distance decider 158 will be described below.

The second controller 160 controls the travel driving force output device 200, the brake device 210, and the steering device 220 such that the host vehicle M passes along the target trajectory generated by the action plan generator 140 at the scheduled times.

The second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of curvature of the target trajectory stored in the memory. The processes of the speed controller 164 and the steering controller 166 are implemented by, for example, a combination of feedforward control and feedback control. As an example, the steering controller 166 executes a combination of feedforward control according to the curvature of the road in front of the host vehicle M and feedback control based on deviation from the target trajectory.

The HMI controller 180 notifies the occupant of prescribed information using the HMI 30. For example, the prescribed information includes information related to traveling of the host vehicle M such as information about the state of the host vehicle M and information about driving control. The information about the state of the host vehicle M includes, for example, a speed of the host vehicle M, an engine speed, a shift position, and the like. Also, the information about the driving control includes, for example, information indicating switching of the driving mode, information about the presence or absence of execution of the driving control and a change in the driving control, information about a situation of the driving control (for example, content of an event which is being executed), error information, and the like. The prescribed information may include information that is not related to the traveling control of the host vehicle M, such as a television program or content (for example, a movie) stored in a storage medium such as a DVD. Also, the prescribed information may include, for example, information about a current position and a destination of the host vehicle M and the remaining amount of fuel.

For example, the HMI controller 180 may generate an image including the above-described prescribed information and allow the display device of the HMI 30 to display the generated image or may generate speech indicating the prescribed information and allow the generated speech to be output from a speaker of the HMI 30. The HMI controller 180 may output information received by the HMI 30 to the communication device 20, the navigation device 50, the first controller 120, and the like.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 such that brake torque according to a braking operation is output to each wheel. The brake device 210 may include a mechanism configured to transfer the hydraulic pressure generated by an operation of the brake pedal included in the driving operation elements 80 to the cylinder via a master cylinder as a backup. Also, the brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operation element 80 to change the direction of the steerable wheels.

[Determining Target Inter-Vehicle Distance in Switching Period]

Hereinafter, a method of deciding on the target inter-vehicle distance during the period of switching from the first driving mode to the second driving mode will be described. The inter-vehicle distance decider 158 decides on the target inter-vehicle distance between the host vehicle M and the preceding vehicle in the driving mode switching period and/or the second driving mode, for example, when the mode decider 150 switches the driving mode of the host vehicle M and when the current driving mode is the first driving mode and a driving mode to which the mode is scheduled to be switched is the second driving mode. For example, the inter-vehicle distance decider 158 compares a first inter-vehicle distance in the first driving mode with a second inter-vehicle distance in the second driving mode and decides on a longer inter-vehicle distance as the target inter-vehicle distance in the switching period.

Also, the inter-vehicle distance decider 158 may derive the target inter-vehicle distance in the switching period with reference to the inter-vehicle setting information 192 on the basis of a current traveling-specific driving mode. Even in this case, a longer distance between the first inter-vehicle distance and the second inter-vehicle distance is derived. FIG. 4 is a diagram for describing content of inter-vehicle setting information 192. In the inter-vehicle setting information 192, an inter-vehicle distance setting pattern is associated with the first driving mode, the second driving mode, the target inter-vehicle distance in the switching period, and the target inter-vehicle distance in the second driving mode. The number and types of inter-vehicle distance setting patterns are not limited to the example of FIG. 4.

In the example of FIG. 4, when the first driving mode is mode C or mode D, the inter-vehicle distance decider 158 decides on the target inter-vehicle distance in the switching period as the target inter-vehicle distance D2 in the second driving mode. Also, the inter-vehicle distance decider 158 determines the target inter-vehicle distance in the switching period as D2 even if the first driving mode is mode B. The target inter-vehicle distance D2 is a distance longer than a target inter-vehicle distance D3 from the preceding vehicle when the host vehicle M travels in modes B, C, and D. Also, in the example of FIG. 4, when the first driving mode is mode A, the inter-vehicle distance decider 158 decides on the target inter-vehicle distance in the switching period as D1 that is the target inter-vehicle distance between the host vehicle M and the traveling vehicle in the case of mode A. The target inter-vehicle distance D1 is a distance longer than the target inter-vehicle distance D2. Also, the target inter-vehicle distance in modes A to D may be changed according to the setting of the driver or the like. In this case, for example, a plurality of types of distances (for example, a short distance, a medium distance, and a long distance (for example, a long distance is equivalent to, for example, a distance between vehicles in a TJP mode)) are set for the target inter-vehicle distance and the driver is allowed to change the distance when the user selects one of them. Also, when the target inter-vehicle distance when the previous state is modes A to D has been compared with the target inter-vehicle distance in the case of mode F, the target inter-vehicle distance of modes A to D may be set to the target inter-vehicle distance of mode F if the target inter-vehicle distance is longer in modes A to D.

Also, the inter-vehicle distance decider 158 may adjust the target inter-vehicle distance in the second driving mode as well as the target inter-vehicle distance in the switching period. For example, although the tracking traveling or the like is executed such that the inter-vehicle distance becomes the second inter-vehicle distance D2 preset at the time of execution of the second driving mode if the first driving mode is modes B to D, an adjustment may be made such that the target inter-vehicle distance from the preceding vehicle after switching to the second driving mode continuously becomes D1 instead of D2 if the first driving mode is mode A. Thereby, because the second driving mode can be executed while the inter-vehicle distance longer than the distance D2 is continued, more stable driving control can be implemented. In this way, by comparing the target inter-vehicle distances before and after switching the driving mode and adjusting the target inter-vehicle distance to a longer distance therebetween even during the execution of the second driving mode, it is possible to secure a sufficient inter-vehicle distance, give a sense of safety to the occupant, and carry out more appropriate automated driving.

Also, when the first inter-vehicle distance in the first driving mode is set for each of a plurality of different modes (automation degrees) included in the first driving mode, the inter-vehicle distance decider 158 may decide on the longest inter-vehicle distance among a plurality of first inter-vehicle distances as the target inter-vehicle distance in the switching period. Thereby, because a sufficient inter-vehicle distance can be secured in the switching period, the system can perform control in plenty of time.

Figure 5:
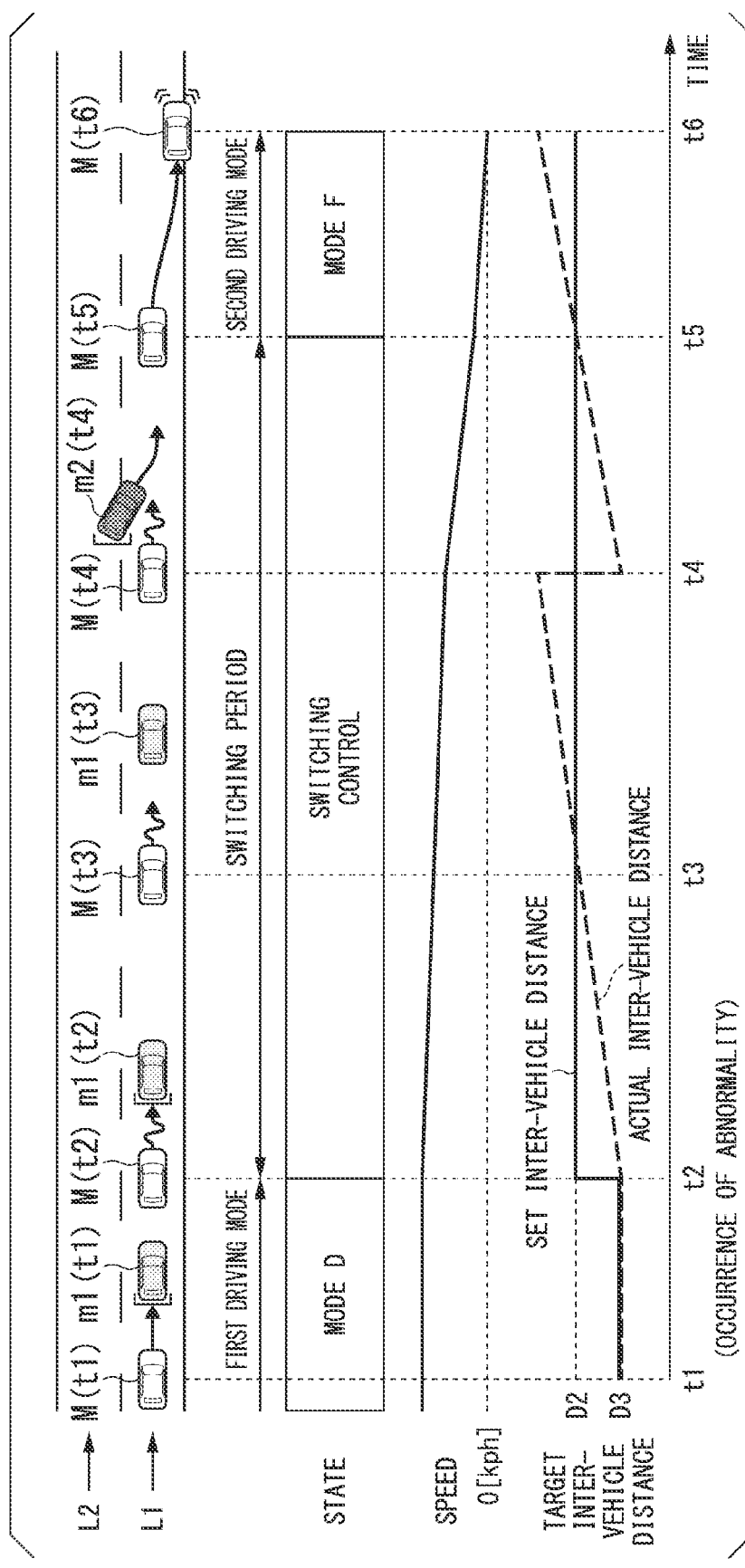
FIG. 5 is a diagram for describing a state of vehicle control in a period of switching from a first driving mode to a second driving mode.

FIG. 5 is a diagram for describing a state of vehicle control in a period of switching from the first driving mode to the second driving mode. In the example of FIG. 5, it is assumed that time t1 is the earliest time and times t2, t3, t4, t5, and t6 become later in that order. Also, it is assumed that positions of the host vehicle M and other vehicles m1 and m2 at time t* when traveling is performed in lanes L1 and L2 are denoted by M(t*), m1(t*), and m2(t*), respectively. Also, in FIG. 5, a relationship between the vehicle speed of the host vehicle M and the target inter-vehicle distance between the host vehicle M and the preceding vehicle is shown as a state of the host vehicle M according to the elapse of time. In the example of FIG. 5, a state of vehicle control in which a driving change for the driver is made due to the occurrence of an abnormality of the host vehicle M while the host vehicle M is traveling in the first driving mode (for example, mode D) and the driving mode is further shifted to the second driving mode (for example, mode F) when the driver does not make the driving change is shown. Content of a control process of the driving controller for each time will be described below.

<Time t1>

At time t1, a scene in which a host vehicle M(t1) traveling in a lane L1 is executing mode D (for example, an ACC mode) of the first driving mode is shown. In this scene, the driving controller recognizes another vehicle m1(t1) that is a preceding vehicle traveling in the lane L1 identical with that of the host vehicle M(t1) and is closest to the host vehicle M(t1) and causes the host vehicle M(t1) to travel behind the other vehicle m1(t1), which has been recognized, by tracking the other vehicle m1(t1). In this case, the driving controller allows the host vehicle M(t1) to travel such that the inter-vehicle distance between the host vehicle M(t1) and the other vehicle m1(t1) becomes the target inter-vehicle distance D3.

<Time t2>

At time t2, for example, a scene in which it is determined that an abnormality has occurred in the host vehicle M on the basis of the determination result of the vehicle state determiner 152 is shown. The abnormality is, for example, a malfunction or the like, and is specifically a case where a surrounding situation of the host vehicle M cannot be recognized by the external detector, a case where recognition performance deteriorates, or the like. For example, when the other vehicle m1 cannot be recognized temporarily due to the deterioration of the recognition performance of the external detector, or the other vehicle m1 is erroneously recognized as another physical object, the mode decider 150 decides to switch the driving mode of the host vehicle M from mode D (the first driving mode) to mode E (the manual driving mode). Also, the mode decider 150 decides to switch the driving mode of the host vehicle M from mode D to mode F (the second driving mode) when a state of the occupant of the host vehicle M is a state in which no manual driving is performed or when no driving change is made even though a prescribed period of time elapses from a notification for prompting the driver to perform the manual driving. Hereinafter, at time t2, it is assumed that it is determined that the occupant of the host vehicle M does not perform manual driving and it is decided to switch the mode from mode D to mode F.

Also, the period for switching from mode D to mode F is a prescribed period of time or longer. Thereby, the vehicle system 1 side can also control switching in plenty of time. In the example of FIG. 5, it is assumed that a period from time t2 to time t5 is a switching period.

When the vehicle travels in the period of switching from mode D to mode F, the driving controller allows the vehicle to travel such that at least some of the functions of mode D are continued. In this case, the inter-vehicle distance decider 158 decides on the target inter-vehicle distance from the preceding vehicle in the switching period as a longer distance between the target inter-vehicle distance in mode D (the first inter-vehicle distance) and the target inter-vehicle distance in mode F (the second inter-vehicle distance). Specifically, the inter-vehicle distance decider 158 switches the target inter-vehicle distance from the target inter-vehicle distance D3 in mode D to the target inter-vehicle distance D2 in mode F.

Also, when an abnormality occurs and it becomes necessary to switch the mode from mode D to mode E or mode F at time t2, the HMI controller 180 may output information indicating the occurrence of an abnormality or mode switching, a driving change request for switching driving to manual driving, or the like to the HMI 30. Thereby, the occupant can be allowed to easily ascertain the state of the host vehicle M, future control content, and the like.

<Immediately Before Time t4 is Reached from Time t2>

Immediately before time t4 is reached from time t2, control for increasing the target inter-vehicle distance between the host vehicle M and the other vehicle m1 from D3 to D2 is performed. Specifically, from time t2, the driving controller slowly decelerates the host vehicle M from the speed at time t1 and increases the inter-vehicle distance from the other vehicle m1. The driving controller allows the host vehicle M to travel such that an actual inter-vehicle distance (an actual distance) from the other vehicle m1 of the host vehicle M becomes D2. Also, even if the actual vehicle distance between the host vehicle M and the other vehicle m1 becomes longer than the target inter-vehicle distance D2 as in a process from time t3, the driving controller may not perform an acceleration process for tracking the other vehicle M. Thereby, safer driving can be implemented in a situation where the recognition performance deteriorates. When the other vehicle m1 decelerates, the driving controller controls the deceleration of the host vehicle M such that the host vehicle M does not come into contact with the other vehicle m1.

<Time t4>

At time t4, a scene in which another vehicle m2(t4) makes a lane change from a lane L2 to a lane L1 in the switching period and cuts in front of a host vehicle M(t4) is shown. In this scene, the driving controller performs deceleration control in which an amount of deceleration is larger than that in a period from time t2 to time t3 by performing a control process such that the host vehicle M(t4) does not come into contact with the other vehicle m2(t4). Also, the driving controller performs speed control such that the inter-vehicle distance between the host vehicle M and the other vehicle m2 becomes the target inter-vehicle distance D2.

Also, when the abnormality of the host vehicle M has been eliminated within the switching period (between time t2 and time t5), the driving controller may allow the host vehicle M to travel in the first driving mode or a driving mode (mode E) having a lower automation degree than the first driving mode if the occupant of the host vehicle M has performed a prescribed operation. The prescribed operation is, for example, an operation of the occupant corresponding to the task of each mode (modes A to D) that is the first driving mode. Thereby, the traveling of the host vehicle M can be continued without an emergency stop operation being performed in mode F.

<In Case of Times t5 to t6>

At times t5 to t6, a scene in which mode F is performed is shown. At time t5, the driving controller performs speed control and steering control for setting a target position for urgently stopping a host vehicle M(t5) and allowing the host vehicle M(t5) to be stopped at the target position. In the case of time t6, a case where the host vehicle M is stopped at the target position is shown. In the example of FIG. 5, the host vehicle M is stopped at a position closer to the road side of the lane L1. Also, after the host vehicle M is allowed to travel and stop at the target position according to the execution of mode F, the driving controller may allow the occupant of the host vehicle M to change driving and switch the host vehicle M to the manual driving mode. Thereby, after the host vehicle M is stopped, it is possible to immediately switch the driving mode to the manual driving mode such that the occupant can drive the host vehicle M.

As described above, in the embodiment, it is possible to reduce a risk with respect to an abnormality or performance deterioration of the host vehicle M by deciding on an inter-vehicle distance from the preceding vehicle in a period of switching from the first driving mode to the second driving mode as a longer inter-vehicle distance between the first inter-vehicle distance in the first driving mode and the second inter-vehicle distance in the second driving mode.

Also, when the state before the switching of the driving mode is mode A (a TJP mode), the inter-vehicle distance decider 158 may set the target inter-vehicle distance in the switching period to the target inter-vehicle distance in mode A. In the TJP mode, it takes time to shift driving to manual driving because there is no need for the driver to perform forward monitoring or gripping of the steering wheel. Thus, it is a high possibility that the target inter-vehicle distance will be set to be longer than those in other modes. Therefore, the system side can perform the driving control in plenty of time by setting the target inter-vehicle distance in the switching period to the inter-vehicle distance in the TJP mode (mode A). Further, for example, in the ACC mode, even if the recognition performance deteriorates, it is possible to allow plenty of time for control on the system side. Also, in the embodiment, it is possible to avoid the complexity of processing in the vehicle system 1 and reduce man-hours for verification and the like without separating behavior when an abnormality has occurred in the host vehicle M or when the driving mode is switched from the first driving mode to the second driving mode due to a difference in a function deterioration part.

[Processing Flow]

FIG. 6 is a flowchart showing an example of a flow of a process executed by the automated driving control device 100. Hereinafter, a process of deciding on an inter-vehicle distance between the host vehicle M and the preceding vehicle in a period of switching from the first driving mode to the second driving mode within the process executed by the automated driving control device 100 will be mainly described. The process of FIG. 6 may be iteratively executed at prescribed intervals or timings.

In the example of FIG. 6, the recognizer 130 recognizes a surrounding situation of the host vehicle M (step S100). Subsequently, the vehicle state determiner 152 determines the state of the host vehicle M on the basis of a detection state of the external detector (for example, the camera 10, the radar device 12, the LIDAR sensor 14, or the sonar) in the host vehicle M (step S102). Subsequently, the driver state determiner 154 determines a state of the occupant of the host vehicle M (step S104).

Subsequently, the mode decider 150 determines whether or not the host vehicle M can travel in the first driving mode on the basis of a recognition result of the recognizer 130 and/or determination results of the vehicle state determiner 152 and the driver state determiner 154 (step S106). When it is determined that the host vehicle M can travel in the first driving mode, the driving controller executes the first driving mode on the basis of the first inter-vehicle distance (step S108). In the processing of step S108, the driving controller allows the host vehicle M to travel such that the inter-vehicle distance between the preceding vehicle and the host vehicle M is, for example, the first inter-vehicle distance.

Also, when it is determined that the host vehicle M cannot travel in the first driving mode in the processing of step S106, the mode decider 150 decides to switch the driving mode from the first driving mode to the second driving mode (step S110). Subsequently, the mode decider 150 compares the first inter-vehicle distance in the first driving mode with the second inter-vehicle distance in the second driving mode and decides on a longer distance therebetween as the target inter-vehicle distance between the host vehicle M and the preceding vehicle in the second driving mode (step S112). Subsequently, the driving controller allows the host vehicle M to travel in the switching period on the basis of the decided inter-vehicle distance (step S114). Subsequently, the driving controller determines whether or not the switching to the second driving mode has been completed (step S116). When it is determined that the switching has not been completed, the process returns to the processing of step S114. When it is determined that the switching has been completed, the driving controller performs the second driving mode on the basis of the second inter-vehicle distance (step S118). Thereby, the process of the present flowchart ends.

According to the above-described embodiment, the automated driving control device 100 includes the recognizer 130 configured to recognize a surrounding situation of the host vehicle M; and the driving controller (the action plan generator 140 and the second controller 160) configured to control one or both of steering and a speed of the host vehicle M. The driving controller allows the host vehicle M to travel in any one of a plurality of driving modes including a first driving mode in which the host vehicle is allowed to travel such that an inter-vehicle distance between a preceding vehicle recognized by the recognizer 130 and the host vehicle M becomes a target inter-vehicle distance and a second driving mode in which the host vehicle M is decelerated and moved to a target position. The driving controller designates an inter-vehicle distance from the preceding vehicle that travels in front of the host vehicle M as a first inter-vehicle distance when the host vehicle M is allowed to travel in the first driving mode. The driving controller designates an inter-vehicle distance from the preceding vehicle as a second inter-vehicle distance different from the first inter-vehicle distance when the host vehicle M is allowed to travel in the second driving mode. The driving controller designates the target inter-vehicle distance from the preceding vehicle in the second driving mode as a longer distance between the first inter-vehicle distance and the second inter-vehicle distance when the driving mode is switched from the first driving mode to the second driving mode in a prescribed state. Thereby, it is possible to allow a host vehicle to travel in a more appropriate state even in a period when a driving mode is switched.

Specifically, according to the above-described embodiment, the host vehicle M is allowed to travel on the basis of the longer target inter-vehicle distance between the first inter-vehicle distance in the first driving mode and the second inter-vehicle distance in the second driving mode in the period when the driving mode of the host vehicle M is switched from the first driving mode to the second driving mode or the target inter-vehicle distance in the TJP mode, such that the vehicle system 1 side can be allowed to perform driving control in plenty of time and a sense of safety can be given to the driver because a sufficient inter-vehicle distance is secured.

Modified Examples

For example, the occupant of the host vehicle M may adjust the target inter-vehicle distance in the plurality of modes included in the first driving mode, the target inter-vehicle distance in the second driving mode (mode F), and the target inter-vehicle distance in the switching period by performing an operation input process for the HMI 30. In this case, the HMI controller 180 may control the target inter-vehicle distance in the switching period such that only a value greater than or equal to the longest inter-vehicle distance among the target inter-vehicle distances in each mode can be set. Thereby, even in a situation in which the occupant can set the target inter-vehicle distance, the target inter-vehicle distance in the switching period can be set to be greater than or equal to the longest target inter-vehicle distance in each mode. Also, the "switching period" in the above-described embodiment may be paraphrased as a "switching section." In this case, the switching section between the first driving mode and the second driving mode may be a prescribed distance or longer. Also, in the embodiment, in addition to (or instead of) a state in which the occupant is determined to be unsuitable for driving on the basis of a monitoring result of the in-vehicle monitor, a state in which the occupant (driver) of the host vehicle M has operated a specific operator (for example, an emergency switch) for performing the second driving mode may be set as a prescribed state. The specific operator may be installed in, for example, the driving operation element 80 or the HMI 30.

The embodiment described above can be represented as follows.

A vehicle control device including:
a storage device storing a program; and
a hardware processor,
wherein the hardware processor executes the program to:
recognize a surrounding situation of a host vehicle;
control one or both of steering and a speed of the host vehicle;
allow the host vehicle to travel in any one of a plurality of driving modes including a first driving mode in which the host vehicle is allowed to travel such that an inter-vehicle distance between a recognized preceding vehicle and the host vehicle is close to a target inter-vehicle distance and a second driving mode in which the host vehicle is decelerated and stopped at a target position;
designate an inter-vehicle distance from the preceding vehicle that travels in front of the host vehicle as a first inter-vehicle distance when the host vehicle is allowed to travel in the first driving mode;
designate an inter-vehicle distance from the preceding vehicle as a second inter-vehicle distance different from the first inter-vehicle distance when the host vehicle is allowed to travel in the second driving mode, and
designate the target inter-vehicle distance from the preceding vehicle in a switching period as a longer distance between the first inter-vehicle distance and the second inter-vehicle distance when the driving mode is switched from the first driving mode to the second driving mode in a prescribed state.

Although modes for carrying out the present invention have been described using embodiments, the present invention is not limited to the embodiments, and various modifications and substitutions can also be made without departing from the scope and spirit of the present invention.

REFERENCE SIGNS LIST

1 Vehicle system
10 Camera
12 Radar device
14 LIDAR sensor
16 Physical object recognition device
20 Communication device
30 HMI
40 Vehicle sensor
50 Navigation device
60 MPU
70 Driver monitor camera
80 Driving operation elements
82 Steering wheel
84 Steering grip sensor
100 Automated driving control device
120 First controller
130 Recognizer
140 Action plan generator
150 Mode decider
152 Vehicle state determiner
154 Driver state determiner
156 Mode change processor
158 Inter-vehicle distance decider
160 Second controller
162 Acquirer
164 Speed controller
166 Steering controller
180 HMI controller
190 Storage
200 Travel driving force output device
210 Brake device
220 Steering device

What is claimed is:
1. A vehicle control device comprising:
a recognizer configured to recognize a surrounding situation of a host vehicle; and
a driving controller configured to control one or both of steering and a speed of the host vehicle,
wherein the driving controller allows the host vehicle to travel in any one of a plurality of driving modes including a first driving mode in which the host vehicle is allowed to travel such that an inter-vehicle distance between a preceding vehicle recognized by the recognizer and the host vehicle becomes a target inter-vehicle distance and a second driving mode in which the host vehicle is decelerated and moved to a target position,
wherein the driving controller designates an inter-vehicle distance from the preceding vehicle that travels in front of the host vehicle as a first inter-vehicle distance when the host vehicle is allowed to travel in the first driving mode,
wherein the driving controller designates an inter-vehicle distance from the preceding vehicle as a second inter-vehicle distance when the host vehicle is allowed to travel in the second driving mode,
wherein the driving controller designates the target inter-vehicle distance from the preceding vehicle in the second driving mode as a longer distance between the first inter-vehicle distance and the second inter-vehicle distance when the driving mode is switched from the first driving mode to the second driving mode in a prescribed state, and
wherein the prescribed state includes a state in which a driving mode in operation cannot continue in the host vehicle or a state in which an occupant of the host vehicle is not suitable for driving.

2. A vehicle control device comprising:
a recognizer configured to recognize a surrounding situation of a host vehicle; and
a driving controller configured to control one or both of steering and a speed of the host vehicle,
wherein the driving controller allows the host vehicle to travel in any one of a plurality of driving modes including a first driving mode in which the host vehicle is allowed to travel such that an inter-vehicle distance between a preceding vehicle recognized by the recognizer and the host vehicle becomes a target inter-vehicle distance and a second driving mode in which the host vehicle is decelerated and moved to a target position,
wherein the driving controller designates an inter-vehicle distance from the preceding vehicle that travels in front of the host vehicle as a first inter-vehicle distance when the host vehicle is allowed to travel in the first driving mode,
wherein the driving controller designates an inter-vehicle distance from the preceding vehicle as a second inter-vehicle distance when the host vehicle is allowed to travel in the second driving mode,
wherein the driving controller designates the target inter-vehicle distance from the preceding vehicle in a switching period between the first driving mode and the second driving mode as a longer distance between the first inter-vehicle distance and the second inter-vehicle distance when the driving mode is switched from the first driving mode to the second driving mode in a prescribed state, and
wherein the prescribed state includes a state in which a driving mode in operation cannot continue in the host vehicle or a state in which an occupant of the host vehicle is not suitable for driving.

3. The vehicle control device according to claim 1, wherein, when the first driving mode includes a plurality of modes whose automation degrees are different and the first driving mode is a mode in which at least a task of monitoring a forward direction of the host vehicle is imposed on the occupant of the host vehicle among the plurality of modes, the driving controller designates the target inter-vehicle distance in a switching period between the first driving mode and the second driving mode as an inter-vehicle distance in the second driving mode.

4. The vehicle control device according to claim 1, further comprising an external detector configured to detect a surrounding situation of the host vehicle,
wherein the recognizer recognizes the surrounding situation of the host vehicle on the basis of a detection result of the external detector, and
wherein the prescribed state is a state in which an abnormality has occurred in at least a part of the external detector.

5. The vehicle control device according to claim 4, wherein the external detector includes at least one of a camera, a radar device, a light detection and ranging (LIDAR) sensor, and a sonar mounted in the host vehicle.

6. The vehicle control device according to claim 1, further comprising an in-vehicle monitor configured to monitor a state of the occupant inside of the host vehicle,
wherein the prescribed state is a state in which it is determined that the occupant is not suitable for driving on the basis of a monitoring result of the in-vehicle monitor.

7. The vehicle control device according to claim 1, wherein a switching period between the first driving mode and the second driving mode is greater than or equal to a prescribed period of time.

8. The vehicle control device according to claim 1, wherein the driving controller allows the host vehicle to travel in the first driving mode or a driving mode having a lower automation degree than the first driving mode when the prescribed state has been eliminated and an occupant of the host vehicle has performed a prescribed operation within a period in which the driving mode is switched.

9. The vehicle control device according to claim 1, wherein the driving controller switches the driving mode of the host vehicle to a manual driving mode when an occupant of the host vehicle has been allowed to drive the host vehicle according to a driving change after the host vehicle was allowed to travel according to the second driving mode.

10. The vehicle control device according to claim 1, wherein the driving controller designates a longest inter-vehicle distance among a plurality of first inter-vehicle distances as the target inter-vehicle distance in a switching period between the first driving mode and the second driving mode when the first inter-vehicle distance in the first driving mode has been set for each of a plurality of different automation degrees included in the first driving mode.

11. The vehicle control device according to claim 1, wherein, when the first inter-vehicle distance has been set for each of a plurality of automation degrees included in the first driving mode and when the host vehicle is traveling in a congestion time-specific tracking mode included in the first driving mode, the driving controller designates the target inter-vehicle distance in a switching period in which the driving mode of the host vehicle is switched from the first driving mode to the second driving mode as the first inter-vehicle distance associated with the congestion time-specific tracking mode.

12. The vehicle control device according to claim 1, wherein a switching period in which the driving mode is switched from the first driving mode to the second driving mode includes a period for prompting the occupant of the host vehicle to perform manual driving.

13. A vehicle control method comprising:
recognizing, by a computer, a surrounding situation of a host vehicle;
controlling, by the computer, one or both of steering and a speed of the host vehicle;
allowing, by the computer, the host vehicle to travel in any one of a plurality of driving modes including a first driving mode in which the host vehicle is allowed to travel such that an inter-vehicle distance between a recognized preceding vehicle and the host vehicle becomes a target inter-vehicle distance and a second driving mode in which the host vehicle is decelerated and moved to a target position;

designating, by the computer, an inter-vehicle distance from the preceding vehicle that travels in front of the host vehicle as a first inter-vehicle distance when the host vehicle is allowed to travel in the first driving mode;

designating, by the computer, an inter-vehicle distance from the preceding vehicle as a second inter-vehicle distance when the host vehicle is allowed to travel in the second driving mode, and designating, by the computer, the target inter-vehicle distance from the preceding vehicle in the second driving mode as a longer distance between the first inter-vehicle distance and the second inter-vehicle distance when the driving mode is switched from the first driving mode to the second driving mode in a prescribed state, wherein the prescribed state includes a state in which a driving mode in operation cannot continue in the host vehicle or a state in which an occupant of the host vehicle is not suitable for driving.

14. A vehicle control method comprising:

recognizing, by a computer, a surrounding situation of a host vehicle;

controlling, by the computer, one or both of steering and a speed of the host vehicle;

allowing, by the computer, the host vehicle to travel in any one of a plurality of driving modes including a first driving mode in which the host vehicle is allowed to travel such that an inter-vehicle distance between a recognized preceding vehicle and the host vehicle becomes a target inter-vehicle distance and a second driving mode in which the host vehicle is decelerated and moved to a target position;

designating, by the computer, an inter-vehicle distance from the preceding vehicle that travels in front of the host vehicle as a first inter-vehicle distance when the host vehicle is allowed to travel in the first driving mode;

designating, by the computer, an inter-vehicle distance from the preceding vehicle as a second inter-vehicle distance when the host vehicle is allowed to travel in the second driving mode, and designating, by the computer, the target inter-vehicle distance from the preceding vehicle in a switching period between the first driving mode and the second driving mode as a longer distance between the first inter-vehicle distance and the second inter-vehicle distance when the driving mode is switched from the first driving mode to the second driving mode in a prescribed state, wherein the prescribed state includes a state in which a driving mode in operation cannot continue in the host vehicle or a state in which an occupant of the host vehicle is not suitable for driving.

* * * * *